3,813,467
METHOD OF PACKING FRESH PORK CARCASSES
Albert Sterling Drain, Phoenix, Ariz., assignor to Armour and Company, Chicago, Ill.
No Drawing. Filed Nov. 26, 1971, Ser. No. 202,584
Int. Cl. A22c 18/00; B65b 25/06
U.S. Cl. 426—393                                    11 Claims

ABSTRACT OF THE DISCLOSURE

A method of packing pork to preserve it against bacterial spoilage during extended storage periods during which time the pork may be shipped to distant places. Pork carcasses, including halves and quarter carcasses, are placed with their skins intact into an envelope of heat shrinkable film, a vacuum drawn, and the carcass encased in the film envelope subjected to heat sufficient to shrink the film and to kill undesired bacteria on the skin. This treatment is followed by storage under refrigerated conditions during which time the packaged pork may be transported to distant places.

BACKGROUND

It may seem strange after all the progress which has been made during the past years in the packing and preservation of meat that the packing industry should still be seeking solutions to problems in the packing and distribution of so common an item as fresh pork.

Refrigeration has been developed in recent years so that with the refrigerator cars and trucks now available there is no difficulty in transporting the fresh pork from the packing house to the warehouse and to the retail stores about the country in the ordinary course of marketing. To a large extent the marketing channels have been set up to reduce the time between the packer and the consumer so that, with the assistance of the effective transportation facilities now available, spoilage can be avoided.

However, the scope of the market for meat has also been extended and trade has been expanded. Surpluses of pork in one part of the country call loudly to be transported to a distant section of the country where a scarcity or a better market condition may exist. International trade in pork has developed and this has brought great demand for better means for preserving fresh pork against spoilage. Up to the present there has been no really good method for packing fresh pork for international shipment over substantial distances which is effective and not subject to substantial economic or technical disadvantages.

Pork may of course be effectively preserved by freezing it and keeping it frozen during distribution. This means of preservation is effective for a period of several months; however, aside from the expense of freezing and the requirement of extensive low temperature storage equipment, freezing affects the quality of the pork. In this sense, pork is different from beef. Upon freezing, pork loses its natural bright pink color and develops an unsatisfactory grayish cast; and the red bone color nomally associated with fresh pork is lost in the freezing process particularly at the backbone. For these and other reasons, frozen pork does not enjoy the acceptability of fresh chilled pork and there has been a great need for developing some way of maintaining the carcasses in fresh condition and free from spoilage during the period of time required for the shipping and marketing cycle. Unless frozen, the pork carcasses are subject to spoilage and especially during the period required for transportation to distant markets the pork develops sourness, off-odors and color changes causing the product to arrive in poor condition and usually unsalable.

Those in the meat packing industry have recognized that up until now there is no way without freezing to preserve against spoilage the fresh pork whole carcasses, halves or quarters during shipment, over long distances in international trade, and such commercial shipment of this commodity in commercial trade has therefore been acknowledged as impossible.

DESCRIPTION OF THE INVENTION

I have discovered a method of packing the pork carcasses which will preserve the quality of the pork and maintain it in fresh condition during shipment over long distances without spoilage and without any of the usual signs of deterioration. Following is a detailed description of one embodiment of my invention:

Hogs may be slaughtered by sticking and bleeding as in the usual practice and the eviscera removed. Hair from the carcass is removed by the aid of scalding as in the usual practice. Further, and in accordance with my improved process I prefer that an open flame be directed against the skin of the carcass to singe any remaining hairs down to the hair follicles and to kill any bacteria on the surface of the skin.

The hog carcass is packed whole or in halves or quarters but it is important to use only the major cuts such as halves or quarters of the animal. For convenience, the term "carcass" is used herein to mean a whole animal carcass or portions thereof not substantially smaller than one quarter of the whole carcass.

The carcasses may be taken from the chill room of the packing house where they have a temperature of from 36 to 42° F. The whole carcasses may be separated into halves and if preferred the halves separated into quarters. The front and hind feet are removed in the usual manner by sawing through the joints and the jowl is removed by cutting through at the deep wrinkle of the skin. It is important to my process that the skin not be removed but left on the carcass throughout the packaging procedure and during storage.

I prefer to select the pork to be packed according to my process avoiding those carcasses which are mutilated or have deep bruises. The carcasses which are selected and from which the feet and jowl have been removed may be protected as to protruding bones by placing paper guards around the foot joints, aitch bone, backbone and breastbone.

Then the carcasses are each placed in a bag made of material which is impervious to the passage of either moisture or gas. Films of this character are available commercially and are sold for example as S612 film, or under the trademark Saran. Chemically this film is a polyvinylidine chloride (hereafter referred to as PVDC). The shrink temperatures of the film vary between brands and some preliminary testing should be done when changing from one manufacturer's products to another.

The air is evacuated from the film bag by pumping using a nozzle inserted into the open end of the bag, and after the air is removed the end of the bag is clipped to seal it against reentry of air. The evacuated package is then passed through a shring tunnel where it is subjected to hot water. The package may either be dipped in the hot water or subjected to a hot water spray, and other suitable means of subjecting the package to heat will occur to those skilled in the art. The temperature of the water must be at least 140° F. to kill the organisms which cause an off condition (characterized by grey-green color, sticky surface, tainted and odiferous) in pork. Because of the characteristics of available shrink film such as PVDC, the optimum temperature is 195° F. when using the S612 and 200–205° F. and when using Saran. The process can be run at lower temperatures, but more time is required. Certain additional organisms are known to be destroyed at 200° F., but these do not appear to be the ones which cause the problem solved by this invention. Preferably the water temperature is maintained to at least 180° F. to insure raising the skin temperature of the carcass to the 140° F. temperature required to kill the deleterious organisms. The exposure to the hot water may be relatively short, of the order of about one to three seconds, for example, depending upon the source of the film. The time can be adjusted easily to the shrink characteristics of the film. This treatment serves to shrink the film tightly to the surface of the carcass, making a tight coating over the skin and serves also to kill any surface bacteria that may then exist on top of the skin beneath the film. During this heat treatment the temperature of the film and also the surface of the meat immediately under the film comes up to approximately the temperature of the water, but due to the short time of the treatment the heat does not penetrate into the interior, and the meat on its interior remains at its refrigerated temperature.

Following the heat treatment just referred to, the packed carcass may be chilled to a temperature under 60° F. preferably from 28° F. to 35° F. and stored. The storage may take the form of refrigeration space in a truck, railway car or sea going vessel while the pork is being transported to a distant market.

I have found that pork processed as above described will stay fresh and salable even when shipped over long distances, for as many as 20 days total while in transit and awaiting sale to the consumer.

More specific examples of carrying out my improved process are given as follows:

(I)

A hog carcass which has been drawn, quartered and dressed, but leaving the skin in place, is placed in a bag made of polyvinylidine chloride polymer film. The air is evacuated from the bag and the bag is sealed and dipped in hot water maintained at a temperature of 186° F., at atmospheric pressure, for three seconds, causing the bag to shrink and tightly fit the surface of the carcass. Then the carcass is placed in storage at a temperature of 28° F.

(II)

In a procedure according to Example I the temperature of the hot water dip is maintained at 210° F.

(III)

In a procedure according to Example I the temperature of the hot water dip is maintained at 195° F.

(IV)

In a procedure according to Examples I and II the bagged carcass is dipped in the hot water for one second.

(V)

In a procedure according to Example I the carcass temperature is adjusted to 59° F. for storage and/or shipment.

(VI)

Five hogs identified as lot No. 2236 were killed, bled, scalded, singed and dressed, but leaving the skin on the carcass. After being thoroughly washed the carcasses were transferred to a chill cooler for 16–24 hours and chilled to an internal temperature of 36 to 43° F. in the thickest part. Thereafter the carcasses were quartered and the bone surfaces were covered with bone guard paper. The quarters were individually wrapped in gas impervious (PVDC) bags. The air was removed from the bags and the bag sealed to insure air vacuum. The bags were then put through a shrink tunnel open to the atmosphere by means of a moving conveyor. Water at temperatures maintained between 180 to 200° F. was sprayed on the bags containing the quarters for two seconds, causing the bags to shrink and adhere to the quarters. The quarters were shipped and when inspected at destination at least 11 days after processing, they were in prime condition.

(VII)

Lot 2307, containing 15 carcasses, was processed as described in Example VI, and stored for three days at a temperature of 32° F.; then the lot was shipped, taking seven days in transit, at a temperature of 28° F. It was examined at its destination at least 12 days after and found processing to be in prime condition.

(VIII)

Lot 2425 contained 20 carcasses. Fifteen were packaged according to Example VI, and five were packaged without a PVDC bag. The lot was stored at 32° F. for three days, and shipped at 28° F. for seven days. Upon arrival at least 12 days after processing the 15 carcasses packaged according to Example VI were found to be in prime condition, whereas the five packaged without a PVDC bag were found to be in "off" condition.

As a theory for explaining the substantial benefit received in the prevention of bacterial spoilage through the use of my improved process, I point to the covering of the skin over the exterior surface of the carcass and the tight film over the top of the skin along with the heat treatment of the surface of the skin while encased in a tight film.

There are no bacteria beneath the surface of the skin, and apparently the application of heat in excess of 140° F. kills bacteria present on top of the skin surface without materially increasing the internal temperature of the meat. The film which is moisture and gas impervious is there to guard against future contamination and to prevent entrance of moisture and oxygen required for the propagation of bacteria. Further, an important factor may be that the skin which in the case of major pieces of meat such as at least a quarter of the whole carcass is a large proportion of the exterior surface area of the meat and is essentially collagen, which presents a relatively barren environment for the growth of bacteria. At any rate, it is apparent that this collagen environment coupled with the moisture and gas impervious film tightly drawn over the surface along with the effect of heat in excess of 140° F. while the film is in place does result in the successful preservation of the pork over an extended period of time, whereas in the absence of these factors spoilage occurs during such time period.

It is further my belief that an additional advantage is gained when the skin of the carcass is subjected to flame singeing before being placed in the film bag.

Further, it is my belief that by packing the carcass pork in the special film at the time the skin surface is sterilized and before the skin temperature has been reduced again to refrigeration temperatures, those bacteria such as the psychrophiles which propagate at refrigeration temperatures never get a chance to start before being excluded by the film.

It appears also that storage of the packaged meat at refrigeration temperatures at least as low as 60° F. inhibits the mesophile bacteria which propagate at temperatures higher than this, while the special features of my invention as above explained block the development of the psychrophilic bacteria which do propagate at the lower temperatures.

However, it should be understood that by setting forth the theories above expressed I make no disclaimer of the invention should the benefits be best explained by some other theory.

It is understood that many modifications may be made in the method herein disclosed and that equivalent steps and procedures may be substituted for those specifically described herein without departing from the inventive principles involved; and it is, therefore, intended that all such modifications and equivalents be covered as they are embraced within the spirit and the scope of the invention.

I claim:

1. A method of packaging fresh pork carcasses comprising placing a pork carcass with it natural skin in place thereon within an enclosure of heat shrinkable film which is impervious to moisture and gas, withdrawing the air from said enclosure, subjecting said enclosure from which air has been withdrawn to a temperature in excess of 140° F. to kill bacteria residing on the surface of said skin which do not survive this temperature whereby the carcass surface is sterilized without materially increasing the internal temperature of said carcass, said temperature being sufficient to shrink said film tightly to the surface of the carcass, and storing said carcass with said skin and film on its surfaces at a temperature of from 28° to 60° F.

2. The method of claim 1 wherein said enclosure is subjected to a temperature of at least 180° F.

3. A method as set forth in claim 1 wherein said storage temperature is between 28° F. and 35° F.

4. A method as set forth in claim 1 wherein said enclosure is subjected to heat by means of contacting same with a fluid.

5. A method as set forth in claim 1 including the step of flame singeing said carcass prior to placing the same in said enclosure.

6. A method as set forth in claim 1 wherein said film is polyvinylidine chloride polymer.

7. A method as set forth in claim 2 wherein said storage temperature is between 28° F. and 35° F.

8. A method as set forth in claim 2 wherein said enclosure is subjected to heat by means of contacting same with a fluid.

9. A method as set forth in claim 2 including the step of flame singeing said carcass prior to placing the same in said enclosure.

10. A method as set forth in claim 2 wherein said film is polyvinylidine chloride polymer.

11. The method of claim 1 wherein said enclosure is subjected to a temperature of from 180° F. to 210° F.

References Cited
UNITED STATES PATENTS

| | | | |
|---|---|---|---|
| 2,280,827 | 4/1942 | Hoveman | 99—194 X |
| 2,376,583 | 5/1945 | De Poix | 99—194 |
| 2,298,779 | 10/1942 | Vogt | 99—174 |
| 2,956,886 | 10/1960 | Baush | 99—194 |
| 2,988,452 | 6/1901 | Cameron | 99—194 |
| 3,017,302 | 1/1962 | Hultkigans | 99—174 X |
| 3,049,428 | 8/1962 | Hopkins et al. | 99—174 |

OTHER REFERENCES

"Food Science and Technology Abstracts," vol. 2, No. 11, November 1970, item 11S1017, p. 1645.

American Meat Institute Foundation, "The Science of Meat and Meat Products," 1960, published by W. H. Freeman & Co., San Francisco, p. 416, *Packaging Procedures, Pigskins.*

HYMAN LORD, Primary Examiner

U.S. Cl. X.R.
426—412